(12) United States Patent
Yang et al.

(10) Patent No.: US 10,184,263 B2
(45) Date of Patent: Jan. 22, 2019

(54) PROTECTIVE DEVICE, IN PARTICULAR A TENT OR MARQUEE, AND CONNECTION DEVICE THEREFOR

(71) Applicant: Westfield Outdoors GmbH, Krefeld (DE)

(72) Inventors: Baoqing Yang, Hangzhou (CN); Uwe Drees, Catcott (GB)

(73) Assignee: Westfield Outdoors GmbH, Krefeld (DE)

( * ) Notice: Subject to any disclaimer, the term of this patent is extended or adjusted under 35 U.S.C. 154(b) by 0 days.

(21) Appl. No.: 15/669,850

(22) Filed: Aug. 4, 2017

(65) Prior Publication Data

US 2018/0038127 A1     Feb. 8, 2018

(30) Foreign Application Priority Data

Aug. 4, 2016   (DE) .................... 20 2016 104 291 U

(51) Int. Cl.
| | |
|---|---|
| *E04H 15/20* | (2006.01) |
| *F16K 15/06* | (2006.01) |
| *E04B 1/19* | (2006.01) |

(52) U.S. Cl.
CPC ........... *E04H 15/20* (2013.01); *F16K 15/063* (2013.01); *E04B 2001/1939* (2013.01);
(Continued)

(58) Field of Classification Search
CPC .............. E04H 15/20; E04H 2015/201; E04H 2015/206
(Continued)

(56) References Cited

U.S. PATENT DOCUMENTS

| | | | | |
|---|---|---|---|---|
| 1,968,421 A | * | 7/1934 | Proctor ................... | F16L 29/04 |
| | | | | 137/599.02 |
| 2,297,150 A | * | 9/1942 | Hunter ................... | E04H 15/20 |
| | | | | 135/906 |

(Continued)

FOREIGN PATENT DOCUMENTS

| | | |
|---|---|---|
| CN | 202645123 U | 1/2013 |
| DE | 20 2007 000758 U1 | 4/2007 |

(Continued)

OTHER PUBLICATIONS

European Search Report for European Patent Application No. 17 16 1445 dated Sep. 22, 2017; 6 pages.
(Continued)

*Primary Examiner* — Noah Chandler Hawk
(74) *Attorney, Agent, or Firm* — Dean W. Amburn; Giroux Amburn PC

(57) ABSTRACT

A protective device is described having a membrane and a support device for the membrane, wherein the support device has an inflatable first support element with a flexible wall which forms a first pressure chamber. The first support element has a first connection port with a first connection opening. The support device has an inflatable second support element with a flexible wall which forms a second pressure chamber. The second support element has a second connection port with a second connection opening. A connection device for connecting the first connection port to the second connection port is provided, wherein the connection device has a first connection part for connecting to the first connection port and a second connection part for connecting to the second connection port. The protective device is characterised in that means are provided for connecting the first and second connection parts to one another in a detachable manner.

17 Claims, 17 Drawing Sheets

(52) U.S. Cl.
CPC .. *E04H 2015/201* (2013.01); *E04H 2015/204* (2013.01); *E04H 2015/206* (2013.01)

(58) Field of Classification Search
USPC ......... 137/223; 251/341, 347, 348, 349, 354
See application file for complete search history.

(56) References Cited

U.S. PATENT DOCUMENTS

| | | | | |
|---|---|---|---|---|
| 2,926,934 | A * | 3/1960 | Gill | F16L 37/23 137/614.04 |
| 3,145,719 | A * | 8/1964 | Johnson | E04H 15/20 52/2.21 |
| 3,785,395 | A * | 1/1974 | Andreasson | F16K 15/20 137/223 |
| 4,876,829 | A * | 10/1989 | Mattick | E04H 15/20 135/125 |
| 5,007,212 | A * | 4/1991 | Fritts | E04H 15/20 135/116 |
| 6,263,617 | B1 * | 7/2001 | Turcot | E04H 15/20 52/2.11 |
| 6,929,016 | B2 * | 8/2005 | Lee | E04H 15/20 135/126 |
| 9,169,664 | B2 | 10/2015 | Shiraishi | |
| 2002/0083653 | A1 * | 7/2002 | Hilbert | E04H 1/1277 52/2.17 |
| 2003/0066559 | A1 * | 4/2003 | Wass | F16K 15/026 137/223 |
| 2007/0074760 | A1 * | 4/2007 | Wu | A47C 27/082 137/223 |
| 2012/0285552 | A1 * | 11/2012 | Song | F16K 15/20 137/223 |
| 2014/0224290 | A1 | 8/2014 | Shiraishi | |
| 2014/0300174 | A1 * | 10/2014 | Maust | E21F 11/00 299/12 |
| 2016/0201351 | A1 * | 7/2016 | Pirkle | E04H 15/20 135/121 |

FOREIGN PATENT DOCUMENTS

| | | | |
|---|---|---|---|
| DE | 11 2012 002 15 T5 | 2/2014 | |
| DE | 20 2014 100322 U1 | 2/2014 | |
| DE | 20 2016 101 34 U1 | 4/2016 | |
| FR | 2 341 017 A1 | 9/1977 | |
| FR | 2341017 A1 * | 9/1977 | ............ E04H 15/20 |

OTHER PUBLICATIONS

English language abstract and machine-assisted English language translation of French Patent Publication No. FR 2 341 017 A1 extracted from www.espacenet.com on Jan. 3, 2018; 6 pages.

\* cited by examiner

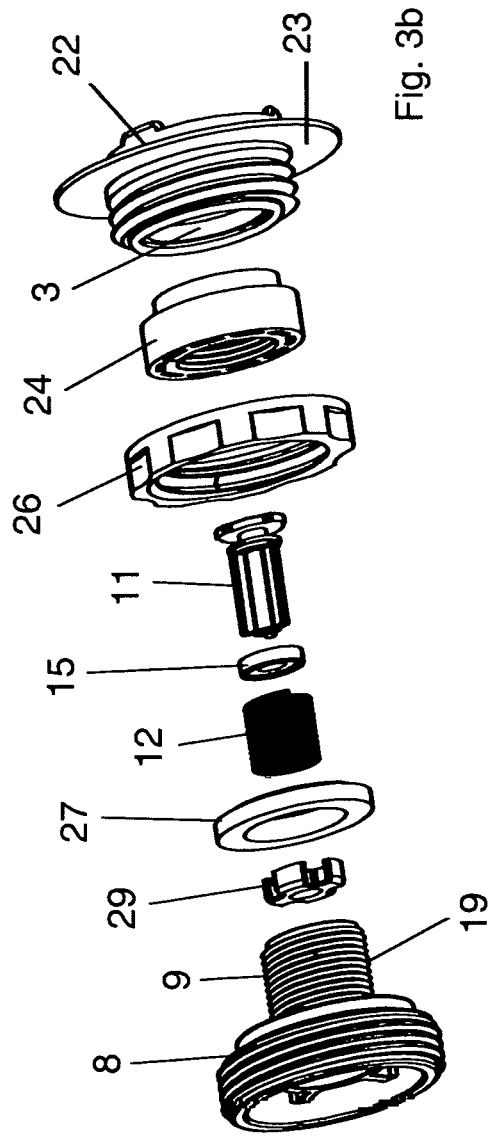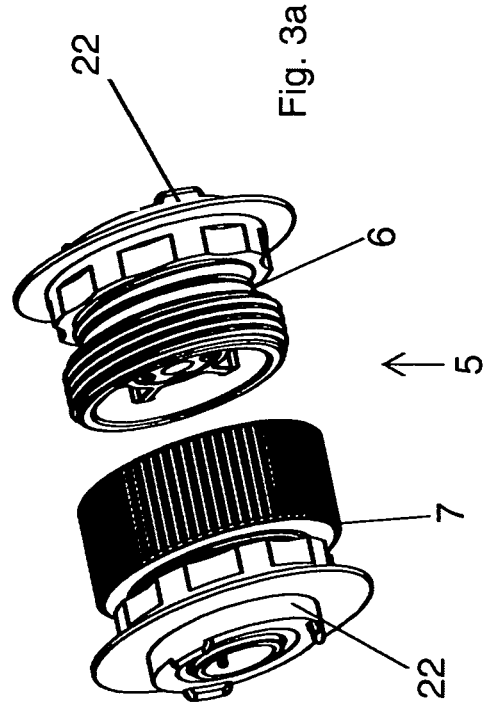

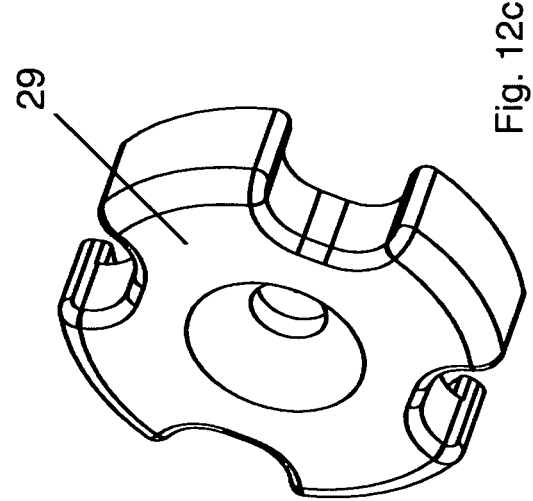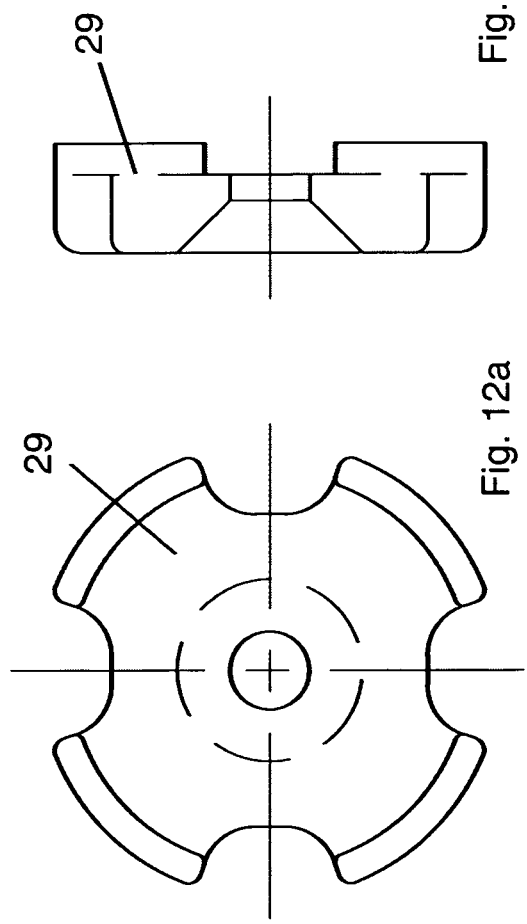

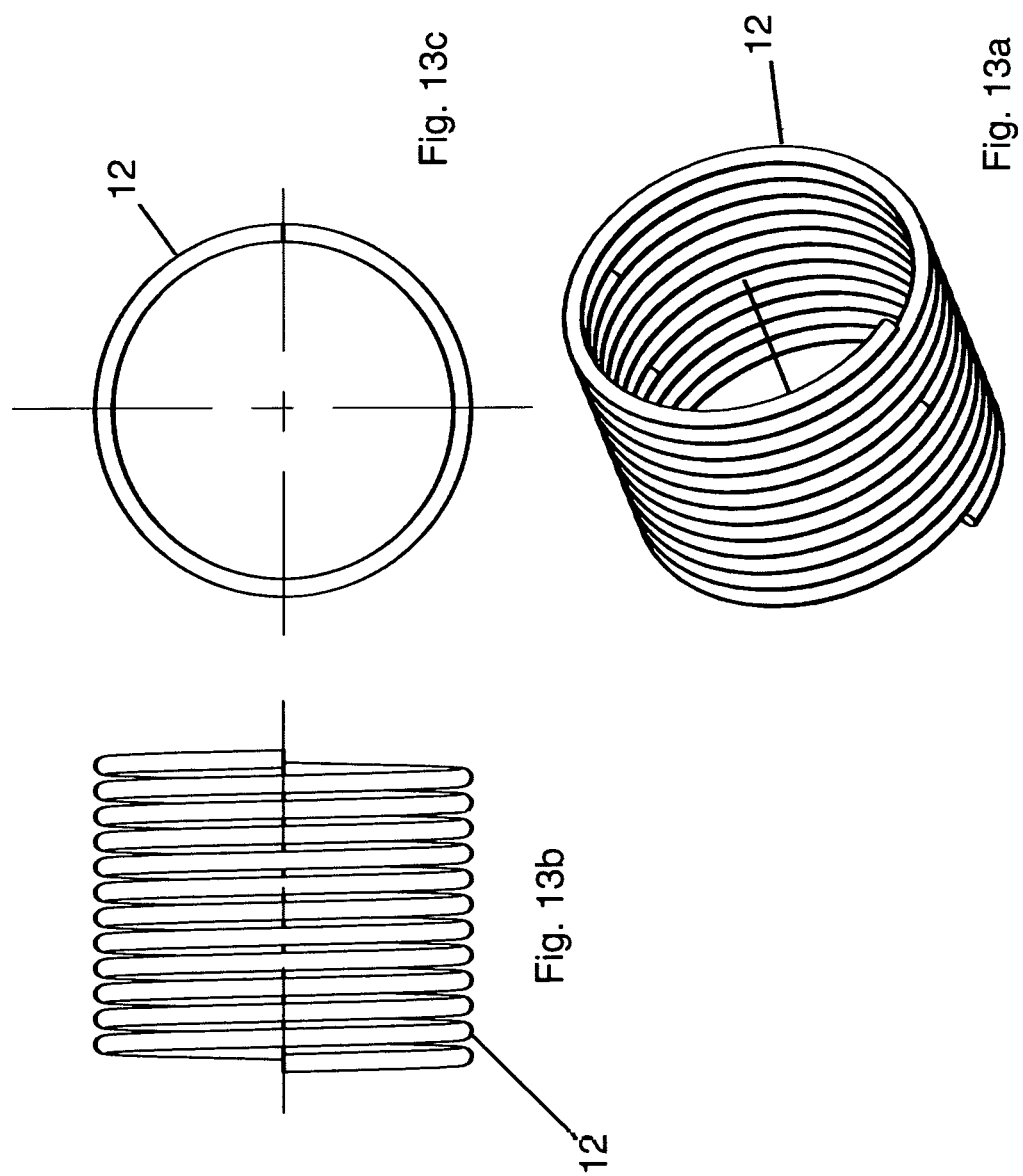

A2

PROTECTIVE DEVICE, IN PARTICULAR A TENT OR MARQUEE, AND CONNECTION DEVICE THEREFOR

RELATED APPLICATIONS

This application claims priority to and the benefit of German Patent Application No. 20 2016 104 291, filed on Aug. 4, 2016, the entire contents of which are hereby incorporated by reference.

TECHNICAL FIELD

The invention generally relates to a protective device such as a tent including its supporting structure.

BACKGROUND

Protective devices which are designed as tents and comprise a tent canvas as a membrane and a support device are known. It is well-established that the support device is formed by flexible or rigid rods, in order to put up the tent canvas. However, it is fairly time-consuming to build up such tents. German Patent Application DE 11 2012 002 152 T5 describes such a tent.

Furthermore, it has already been proposed to use protective devices comprising support devices which have inflatable support elements. In this respect, German Patent Application DE 20 2014 100 322 U1 describes a tent comprising tent poles which are connected in crosswise fashion and have inflatable air pipes. A further tent comprising inflatable chambers is described in Chinese Patent CN202645123U. In this case, it is disadvantageous that handling is still not ideal.

German Patent Application DE 20 2016 101 349 U1 describes a further protective device comprising inflatable support elements which are connected with connection devices. Each of these designs has limitations and/or significant manufacturing costs. Therefore, there are opportunities for improvement of protective devices and their related supportive structures.

SUMMARY

The object of the invention is to provide a protective device which can be handled in a particularly simple and reliable manner and can be produced in a cost-effective manner.

This object is achieved by the features of the invention which relates to a protective device comprising a membrane and a support device for the membrane, wherein the support device comprises an inflatable first support element with a flexible wall which forms a first pressure chamber, wherein the first support element has a first connection port with a first connection opening, wherein the support device has an inflatable second support element with a flexible wall which forms a second pressure chamber, wherein the second support element has a second connection port with a second connection opening, wherein a connection device for connecting the first connection port to the second connection port is provided, wherein the connection device has a first connection part for connecting to the first connection port and a second connection part for connecting to the second connection port.

Accordingly, the protective device is made for connecting the first and second connection parts to one another in a detachable manner. This ensures particularly simple handling. The bipartite design of the connection device can be handled in a particularly simple manner and renders it possible for a detachable connection to be established between the support elements. Therefore, only relatively small and lightweight components have to be transported in each case. In particular, this design renders it possible initially for the first connection part to be connected to the first support element and for the second connection part to be connected to the second support element and then for the first and second connection parts to be connected to one another. This is particularly advantageous when the first and second connection parts are connected to the first and second support elements respectively by means of a screw connection. This also permits repeated connection and separation of the first and second connection parts and thus facilitates the assembling and dismantling of the support device. Ease of handling is assisted if the component parts are manually assembled. The protective device can be designed in particular as a tent, wherein the membrane can be formed as a tarpaulin. The tent can be designed e.g. as a free-standing tent or as an awning e.g. for a caravan, a recreational vehicle or an entrance. The tent can also be designed as a party tent. The described design makes it possible to produce e.g. a tent with different lengths. For this purpose, the required number of support elements are connected to one another and pumped up at the connection ports. Furthermore, the protective device can be designed as a marquee. In the case of a marquee, the membrane can be formed as a marquee canvas.

In one advantageous non-limiting embodiment, provision is made that the connection device has a valve which shuts off the first connection opening. Preferably, the valve has a movable valve body and a valve seat and a spring which urges the valve body against the valve seat. The valve seat can be arranged in particular in the first connection part. Preferably, the spring is designed as a helical compression spring. The valve seat can be formed in particular in an annular manner.

In a further improvement, provision is made that the valve body has a holding portion for the spring. Preferably, the holding portion has ribs which lie against an inner side of the spring.

In the preferred manner, provision can be made that the movable valve body has a sealing element for abutment against the valve seat. Preferably, the sealing element is a separate sealing element. The separate sealing element can be formed in particular in an annular manner. The valve body can have in particular a groove-shaped receptacle for the sealing element. The movable sealing body can be moved between an open position and a closed position in which a valve body lies against the valve seat.

In a preferred embodiment, provision is made that the valve body has a bearing arrangement for the spring. The bearing arrangement can be formed by a holding body. The holding body can be connected to the remainder of the valve body by fastening means, such as, e.g. a screw.

In one advantageous non-limiting embodiment, provision is made that the valve has clamping component for fixing the valve body in the open position. In this manner, the valve can be held in an open position against the spring force. The clamping component can comprise protrusions which are arranged on the inner side of the socket described in greater detail below. The valve body can be moved, e.g. by rotation, between a position in which the clamping component fixates the valve body and a position in which the clamping component do not fixate the valve body.

In a further improvement, provision is made that the first connection part has a socket in which the valve body is arranged. Preferably, the first connection part is connected to the first connection port via the socket. In a particularly preferred manner, connection means are formed on the outer side of the socket. The connection means can comprise in particular a thread. The thread can be formed in particular as an external thread. The socket can have a through-bore.

Preferably, provision is made that a stop for the spring is arranged in the socket. The stop can be formed in particular by means f an inwardly pointing protrusion. The valve seat can be formed on the opposite side of the protrusion.

Furthermore, it is preferred that the first connection part has a main body. In particular, the socket can be arranged on the main body. Preferably, the main body has a larger outer diameter than the socket. Preferably, the outer diameter of the main body is between 1.5 times and 3 times the outer diameter of the socket.

In one advantageous design, provision is made that connection means for connecting to the second connection part or a cover are provided on the main body. These connection means can comprise a thread and preferably an external thread.

In one advantageous embodiment, provision is made that a cover is provided which is placed onto the first connection part. In this manner, the first connection part can also be used if it is not connected to a second connection part. The valve closes the first connection port. The cover serves to protect the valve from soiling. In addition, the sealing action can be improved by means of the cover.

In an advantageous manner, provision can be made that the second connection part has a socket. Preferably, connection means are formed on the outer side of the socket. The connection means can comprise in particular a thread. The thread can be formed in particular as an external thread. The socket can have a through-bore.

Furthermore, provision can be made that the second connection part has a main body. In particular, the socket can be arranged on the main body. Preferably, the main body has a larger outer diameter than the socket. Preferably, the outer diameter of the main body is between 1.5 times and 3 times the diameter of the socket. Connection means for connection to the first connecting part can be provided on the main body. These connection means can comprise a thread and in particular a nut which can be screwed to the external thread of the main body of the first connection part.

In a preferred non-limiting embodiment, provision is made that the second connection part has an actuating element which is arranged in such a manner that it moves the valve body from a closed position to an opened position if the second connection part is attached to the first connection part. In this manner, the valve can be held in the opened position. This allows, inter alia, the first and second pressure chambers to be connected to one another and thus to be inflated at the same time. Therefore, the support device can be inflated from one port. Separate inflation of the individual support elements is not required. Preferably, the actuating element has an actuating cam which is formed on the main body. In particular, the actuating cam can be formed in a protruding manner.

Preferably, the support device has further correspondingly formed support elements, wherein in each case two support elements are connected by a further connection device. In this manner, the support device can be assembled in modular fashion from any number of support elements. At the same time, handling remains simple because a plurality of support elements which are connected by means of connection devices can be pumped up at the same time via a single port.

In accordance with the invention, a first seal can be provided which seals the first connection part with respect to the first connection port. Preferably, the first connection part has a groove-shaped receptacle in which the seal is arranged. Preferably, the seal is annular. In particular, the seal can be arranged in a region of the main body adjoining the socket.

In a preferred non-limiting embodiment, provision is made that a second seal is provided which seals the second connection part with respect to the second connection port. Preferably, the second connection part has a groove-shaped receptacle in which the seal is arranged. Preferably, the seal is annular. In particular, the seal can be arranged in a region of the main body adjoining the socket.

Furthermore, provision can be made that a third seal is provided which seals the main body of the first connection part with respect to the main body of the second connection part. The seal can be arranged in particular in a groove and can be formed in an annular manner. Preferably, the seal is arranged in a groove of the second connection part.

In accordance with the invention, it is preferred that the first support element and/or the second support element each has a port element which forms the first or second connection port. Preferably, the port element has a flange for connecting to the flexible wall.

Furthermore, provision can be made that the port element has a receptacle for the socket of the first or second connection part. The receptacle can be formed in a cylindrical manner. Preferably, the receptacle has an internal thread into which the socket can be screwed.

In an advantageous manner, provision can be made that the port element has an insert which forms the connection opening. In a particularly preferred manner, the insert consists of a harder material than the flange. Formed in the insert can be the internal thread into which the socket of the first or second connection part can be screwed.

The invention also relates to a connection device for the described protective device, comprising a first connection part for connecting to a first support element and a second connection part for connecting to a second support element, wherein means are provided for connecting the first and second connection parts to one another in a detachable manner. Further features of the connection device will be apparent from the description of the protective device.

Further objectives, features, advantages and possible applications of the present invention will be apparent from the description hereinafter of an exemplified embodiment with reference to the drawings. All of the described and/or figuratively illustrated features form the subject matter of the invention in their own right or in any meaningful combination, even irrespective of the combination in individual claims or dependency references thereof.

BRIEF DESCRIPTION OF THE DRAWINGS

FIG. 3a shows the connection device of FIG. 1, comprising a first and a second connection part and the associated port elements;

FIG. 3b shows an exploded view of the first connection part of FIG. 3a;

FIG. 3c shows an exploded view of the second connection part of FIG. 3a;

FIGS. 12a-12c show the holding body in a plan view, side view and in a perspective view;

FIGS 13a-13c show the spring of the valve of FIG. 3a in a perspective view, side view and plan view;

DETAILED DESCRIPTION

Figure 1:
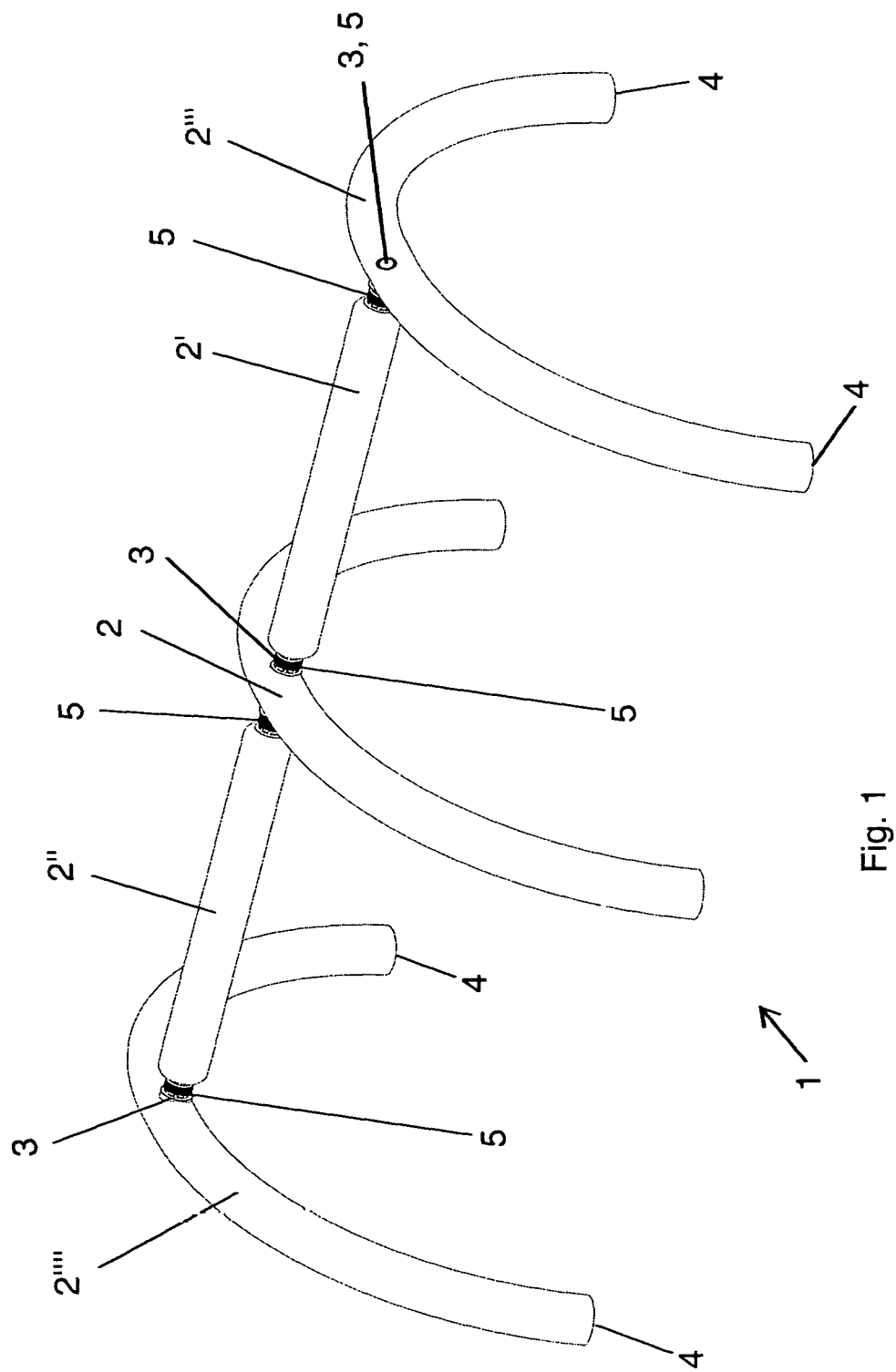
FIG. 1 shows a support device in accordance with the invention for a protective device comprising a connection device.
Figure 2:
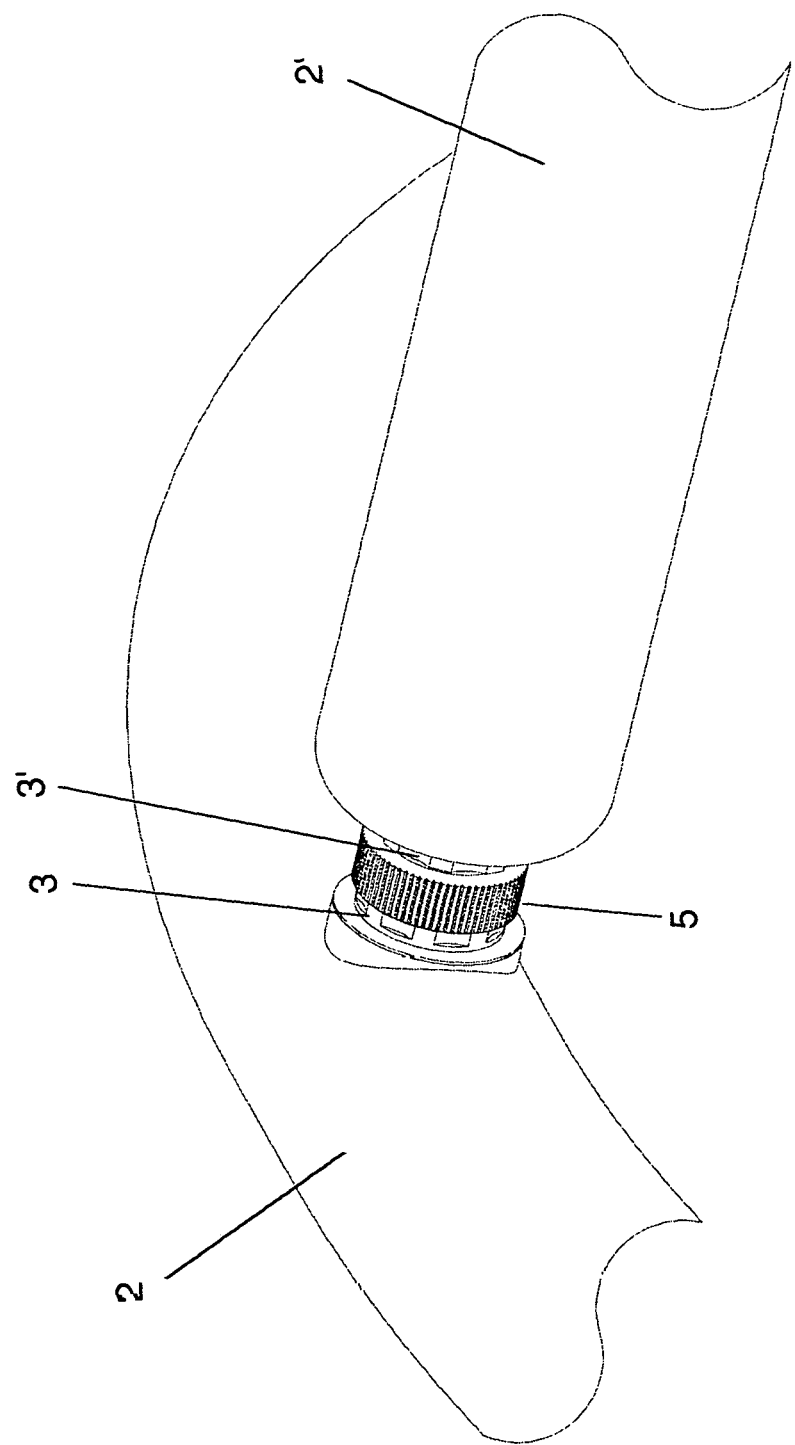
FIG. 2 shows an enlarged section of FIG. 1.

Referring to FIGS. 1-15 the invention includes a support device 1 for a protective device such as a tent. The protective device includes a membrane, not illustrated, which can be fastened to the support device. Preferably, the membrane is laid on the support device 1. Alternatively, it is possible to fasten the membrane underneath the support device 1. The membrane can cover the support device completely or partially. In particular, the membrane can be provided with openings which permit access therein. The membrane can cover the support device completely or partially. The membrane can be designed in particular as a tarpaulin or a tent canvas.

The support device 1 has a plurality of inflatable support elements. The first support element 2 has a first pressure chamber. This likewise applies to the second support element 2' and the further support elements 2", 2''', and 2''''. The support elements 2, 2', 2", 2''' and 2'''' are each designed as inflatable tubes. They have an air-tight flexible wall. The tubes can be pumped up by supplying a gas under pressure, in particular air. The air-tight wall of the tubes is flexible such that the support elements can be folded together in the non-inflated state and accordingly can be packed up to a small size.

The first support element 2 has a first connection port 3. The second support element 2' has a second connection port 3'. The first support element 2 can be attached to the second support element 2' by means of the connection ports 3, 3', so that the first and second pressure chambers are flow-connected to one another via the connection openings. In this manner, the first support element 2 and the second support element 2' can be pumped up together. Therefore, it is not necessary to inflate the support elements individually.

The figures illustrate one embodiment in which the first support element 2 has a plurality of connection ports 3. In the exemplified embodiment, these connection ports are arranged on the opposite sides of the support element 2. In this manner, the second support element 2' can be arranged on one side and the third support element 2" can be arranged on the opposite side and both can be attached to the support element 2 in such a manner as to be flow-connected. The second support element 2' is connected to the support element 2''' by means of a further connection port. The support element 2" is connected to the support element 2'''' by means of a connection port. In this manner, the support device 1 can be assembled in modular fashion from a desired number of support elements. The embodiment of the connected connection ports renders it possible for the pressure chambers of all of the support elements to be pumped up together.

Drawing attention to FIG. 1 the support elements 2, 2''' and 2'''' are formed in an arcuate manner. As illustrated, the arc is open at the bottom. The support elements 2, 2''' and 2'''' each have two bearing surfaces 4 for bearings on the ground. The support elements 2' and 2" are formed in a straight manner and each connect two arcuate support elements 2, 2''' and 2'''' arranged next to one another.

In the illustrated exemplified embodiment, the connection ports 3 are each arranged in an upper region of the support elements.

Figure 3C:
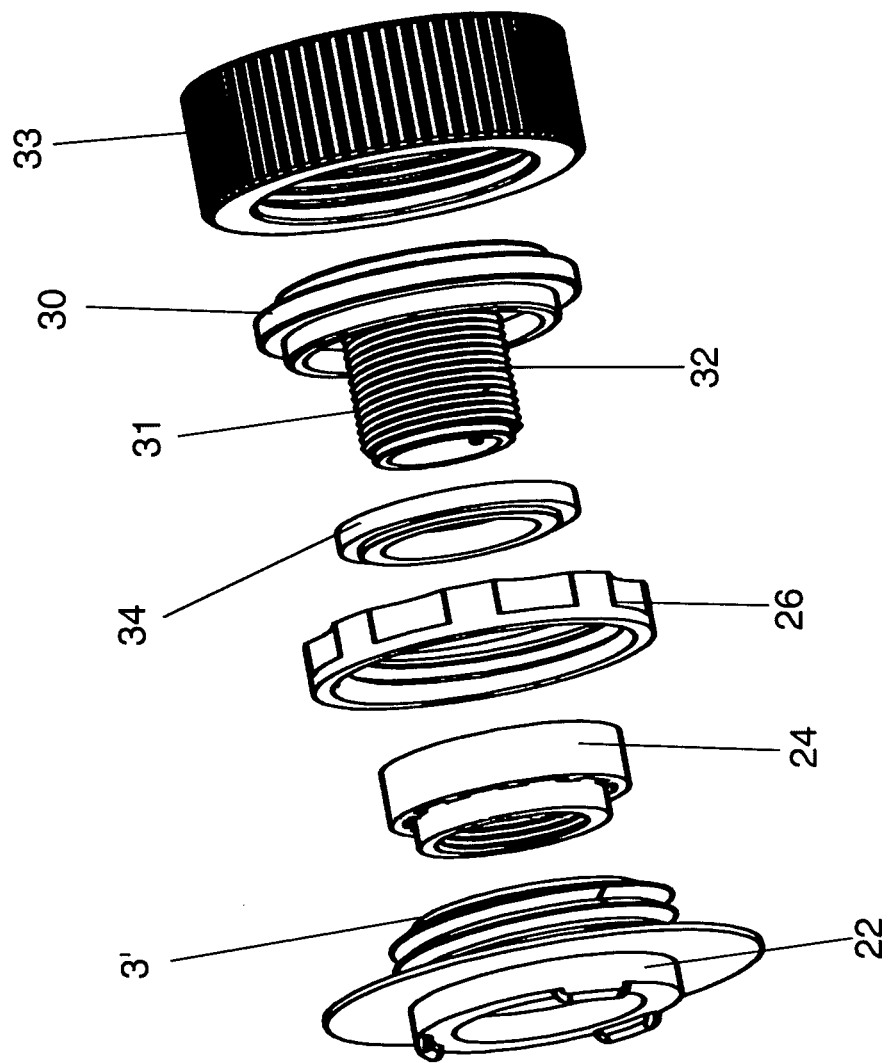
Figure 4B:
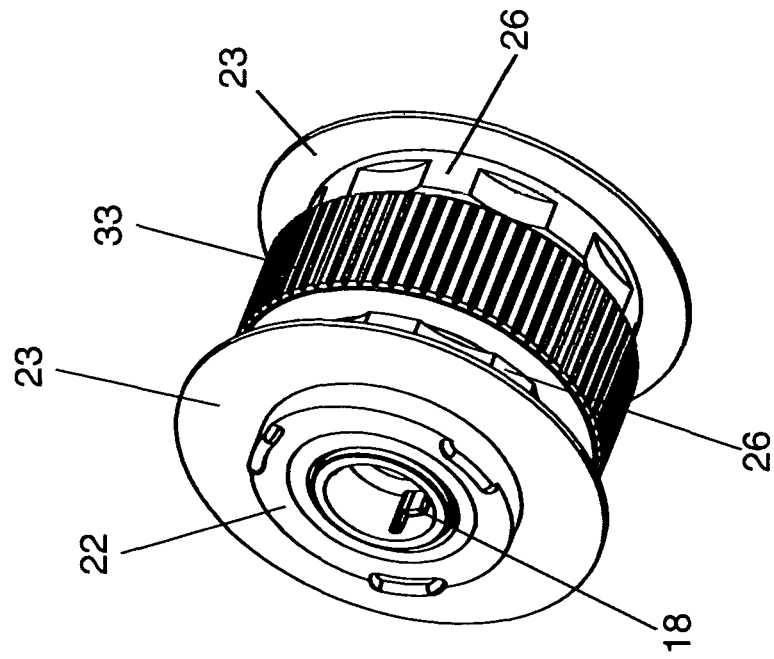
FIGS. 4a-4d show the connection device of FIG. 3a, comprising the first connection part which is connected to the second connection part, in a side view, perspective view, longitudinal sectional view and plan view.
Figure 4A:
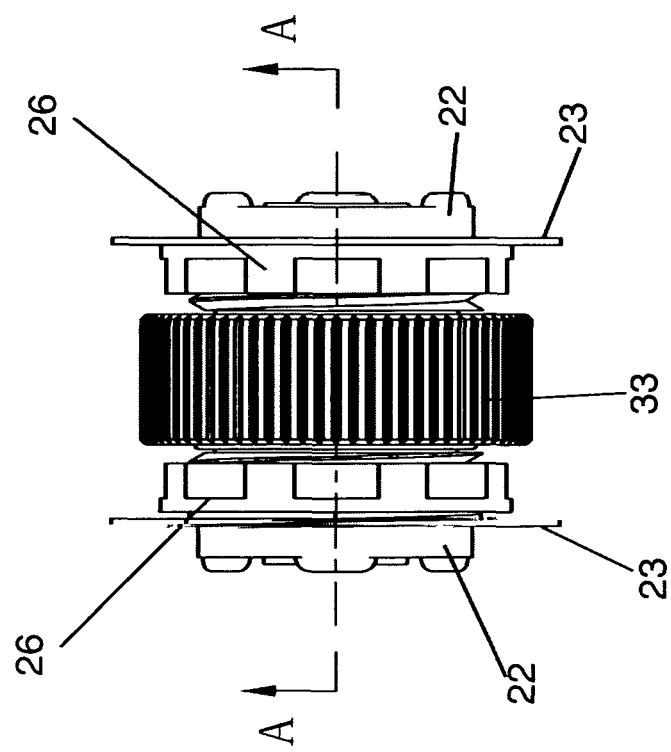
Figure 4D:
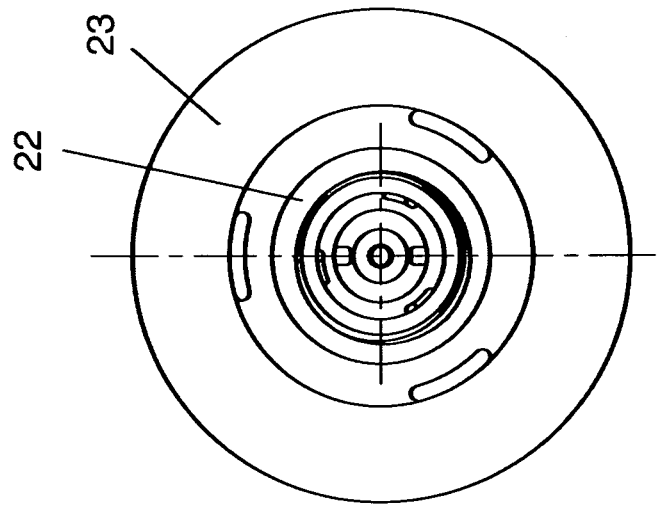
Figure 4C:
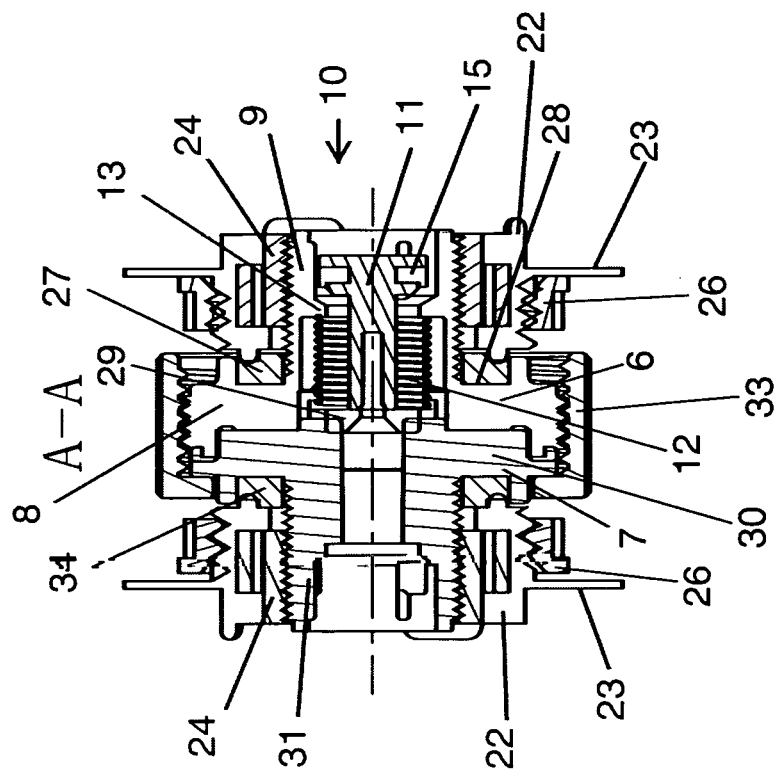
Figure 5A:
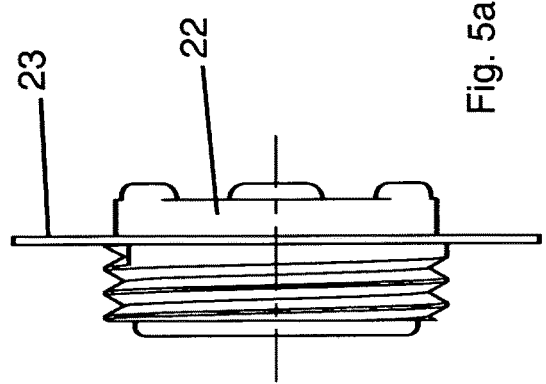
FIGS. 5a-5c show the port elements for the first and second connection part of FIG. 3a in a side view, perspective view and plan view.
Figure 5B:
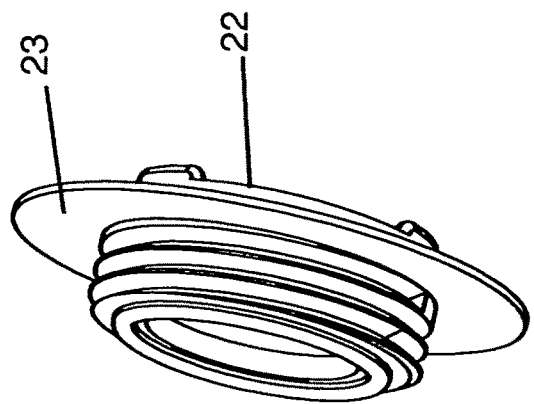
Figure 5C:
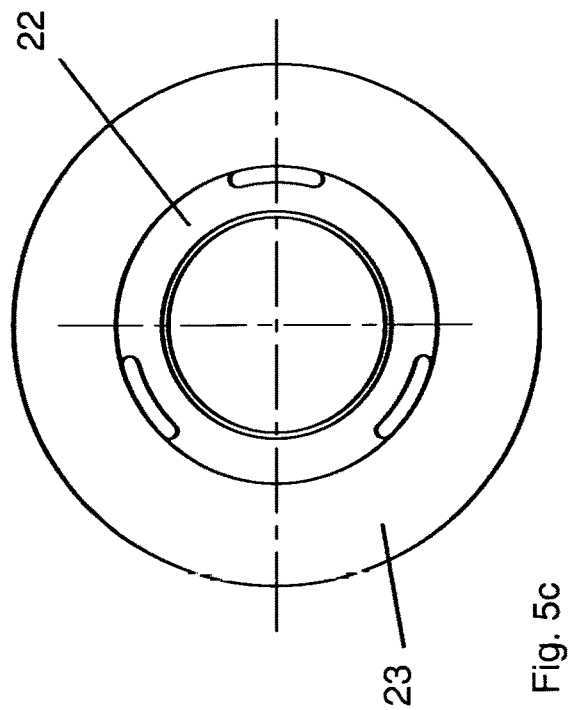
Figure 6C:
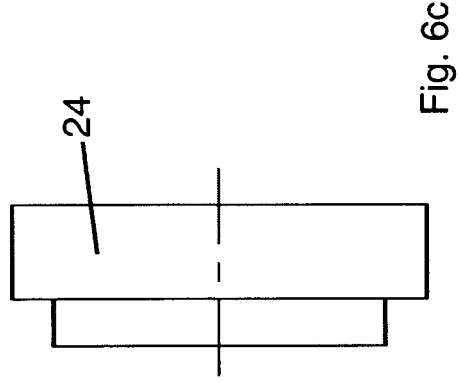
FIGS. 6a-6d show an insert of the port element of FIG. 5a in a plan view, longitudinal sectional view, side view and perspective view.
Figure 6D:
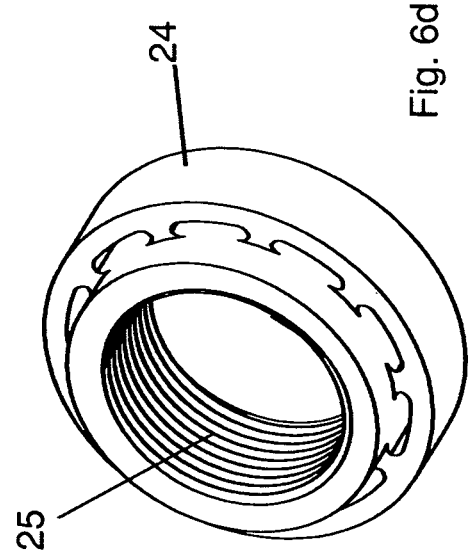
Figure 6A:
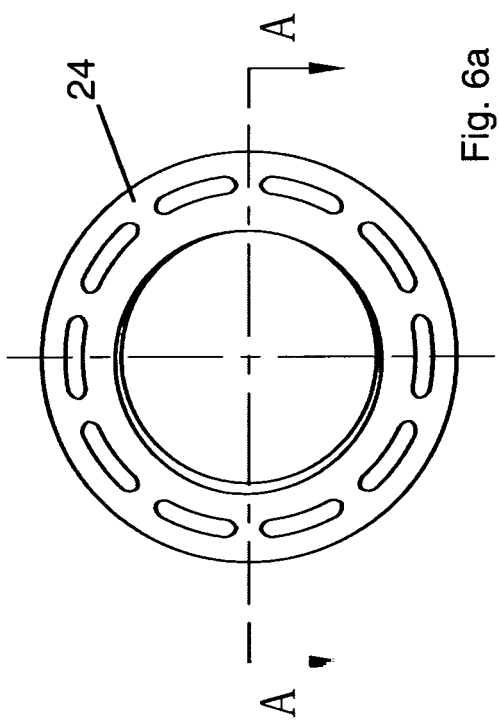
Figure 6B:
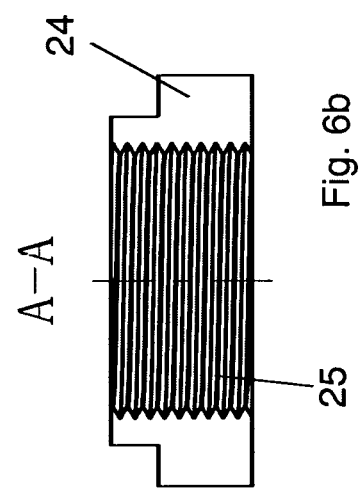
Figure 7D:
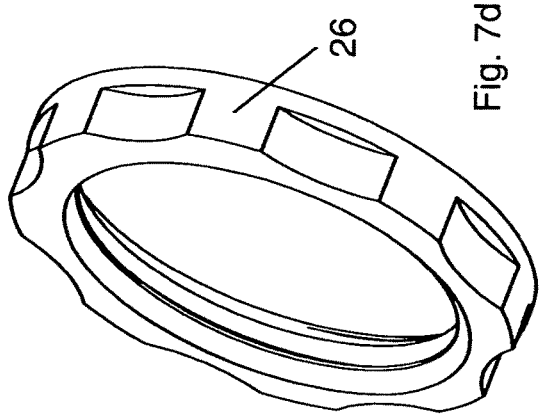
FIGS. 7a-7d show a clamping element for the port element of FIG. 5a in a plan view, longitudinal sectional view, side view and perspective view.
Figure 7C:
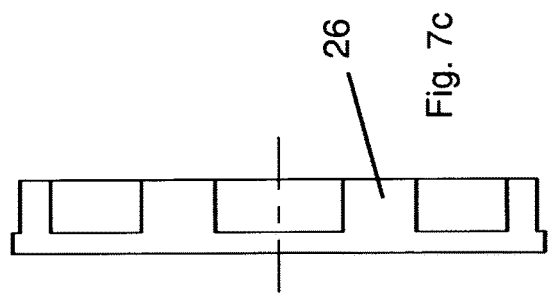
Figure 7A:
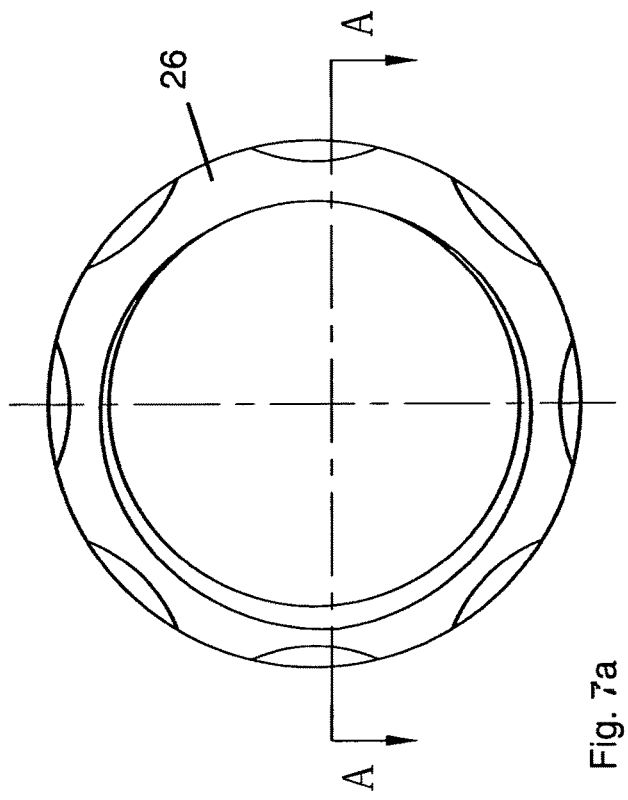
Figure 7B:
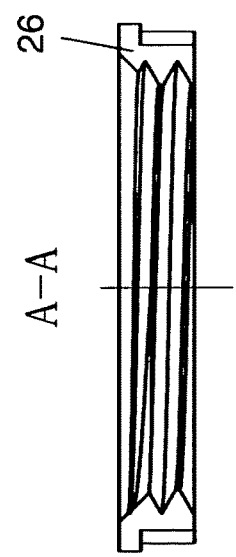
Figure 8B:
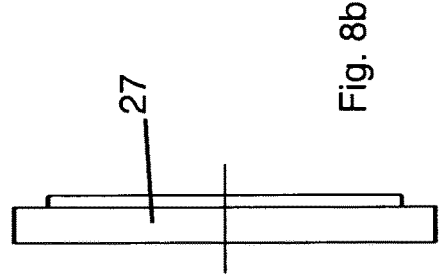
FIGS. 8a-8c show the seal of the first or second connection part of FIG. 3a in a plan view, side view and perspective view.
Figure 8C:
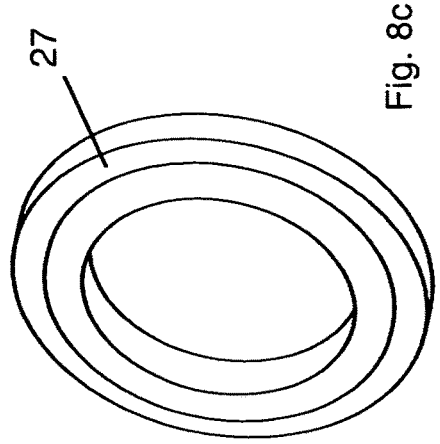
Figure 8A:
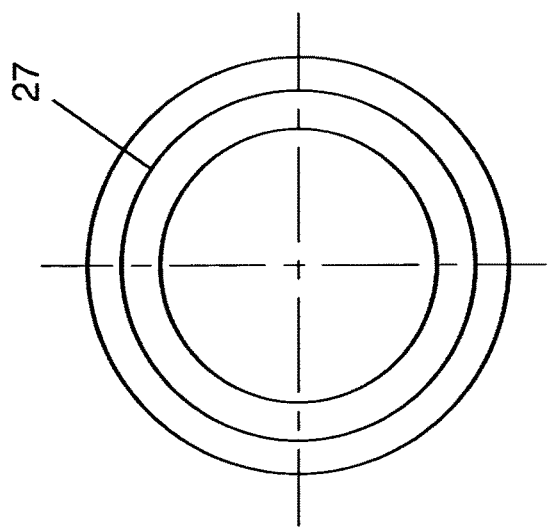
Figure 9D:
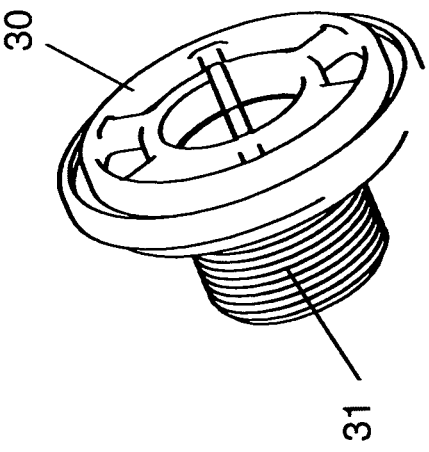
FIGS. 9a-9d show the main body of the second connection part of FIG. 3a in a side view, plan view from above, plan view from below and in a perspective view.
Figure 9C:
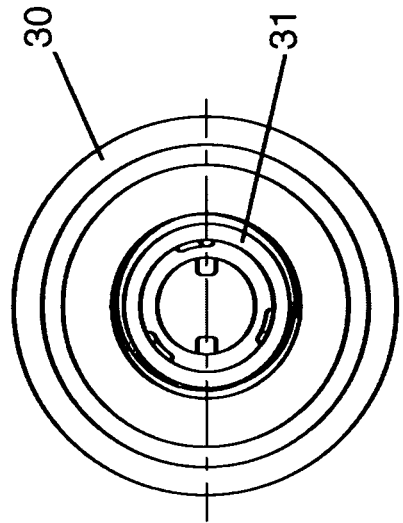
Figure 9A:
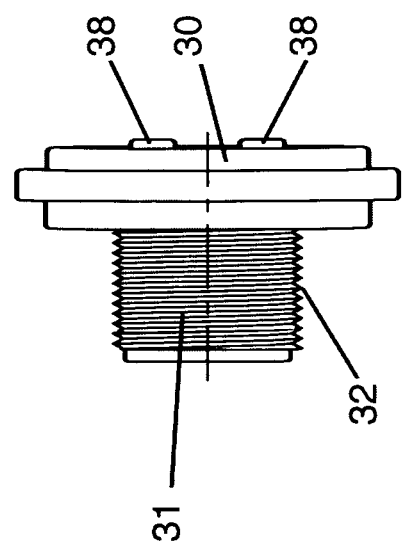
Figure 9B:
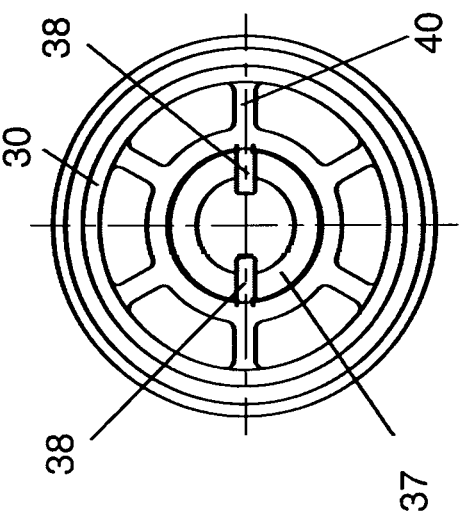
Figure 10A:
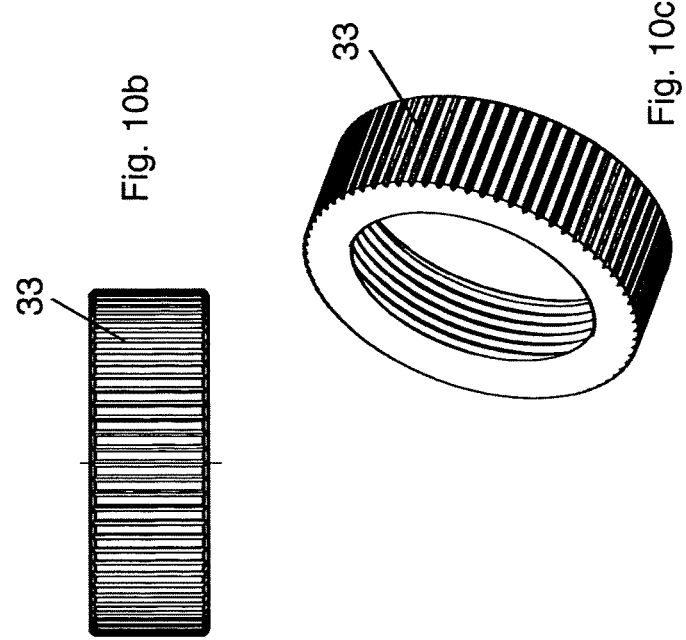
FIG. 10a-10e show the nut of FIG. 3a in a longitudinal sectional view, side view, perspective view, plan view from above and plan view from below.
Figure 10B:
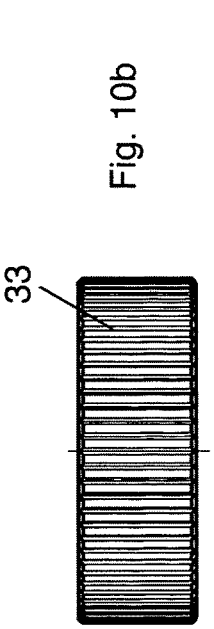
Figure 10C:
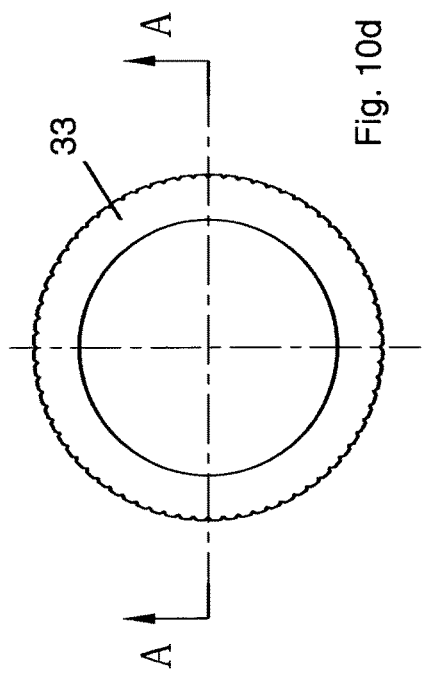
Figure 10D:
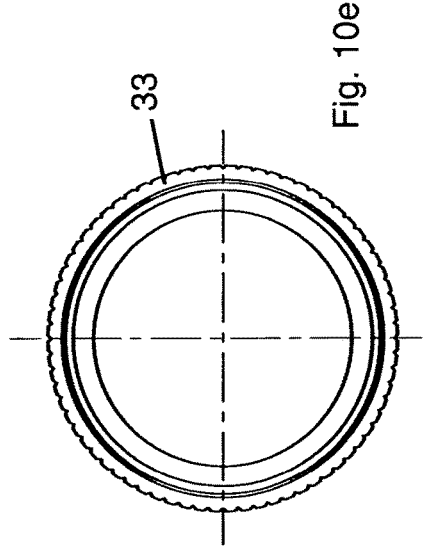
Figure 10E:
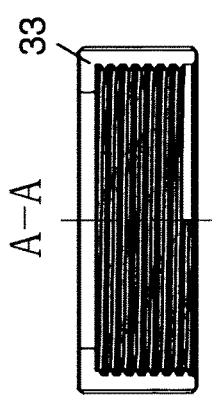
Figure 11A:
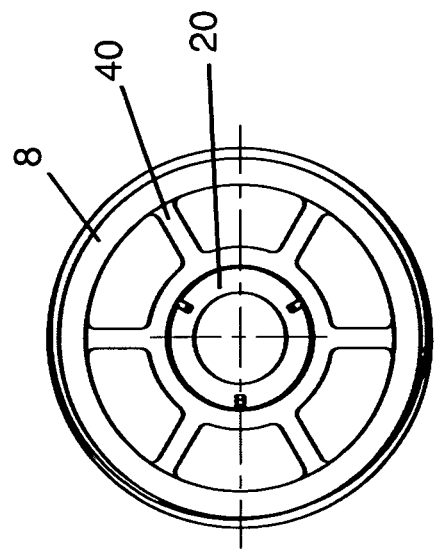
FIGS. 11a-11d show the main body of the first connection part of FIG. 3a in a side view, plan view from above, plan view from below and in a perspective view.
Figure 11B:
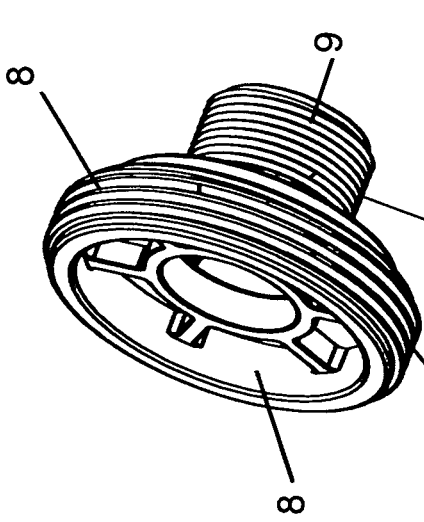
Figure 11C:
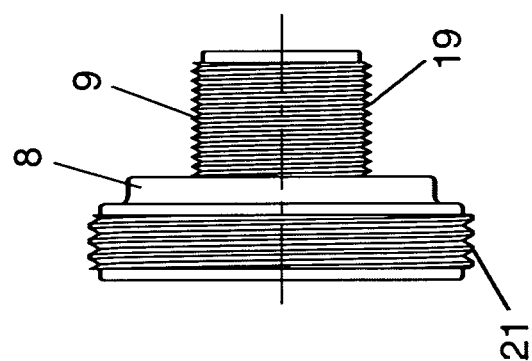
Figure 11D:
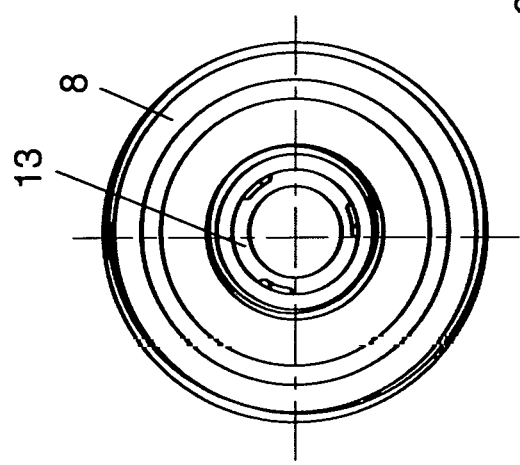
Figure 14B:
FIGS 14a-14c show the sealing element of FIG. 3b in a plan view, side view and perspective view.
Figure 14C:
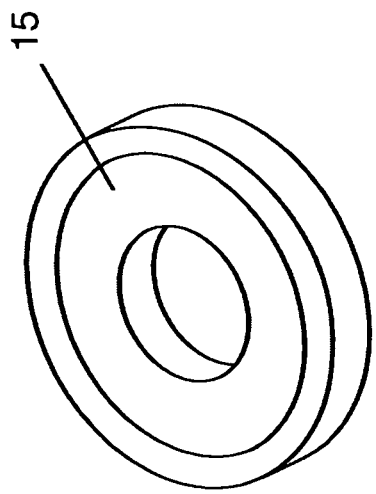
Figure 14A:
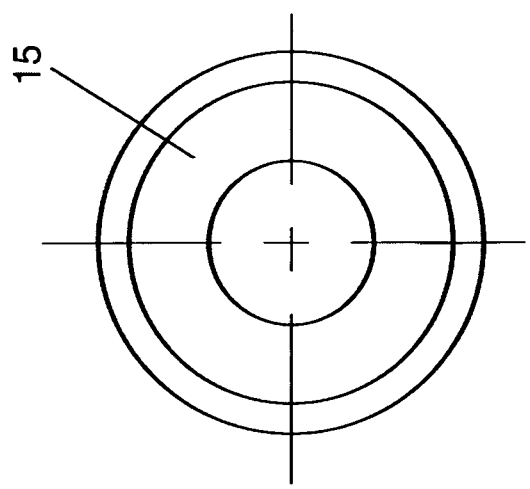

It is also evident that the first support element 2 and the second support element 2' are connected to one another by means of a connection device 5. The further support elements are also connected to one another by means of identically designed connection devices 5. The connection 5 is illustrated more precisely in FIG. 3a. Here, it can be clearly seen that the connection device 5 has a first connection part 6 and a second connection part 7. Returning attention to FIGS. 1-15, and in particular FIG. 3a, the first connection part 6 is detached from the second connection part 7. FIGS. 3b and 3c show exploded views of the components of the first connection part 6 and of the second connection part 7.

The first connection part 6 has a main body 8. The main body has a substantially cylindrical shape. A socket 9 is arranged on the main body 8. As illustrated, the main body 8 has a larger outer diameter than the socket 9.

The first connection part 6 has a valve 10. The valve 10 comprises a movable valve body 11 and a spring 12. The valve 10 is arranged in the socket 9. It comprises a valve seat 13 which is arranged in the first connection part 6. This can also be seen in FIGS. 11a-d which illustrate the main body 8. Moreover, the spring 12 which is designed as a helical compression spring is illustrated in greater detail in FIGS. 13a-c.

Figure 15C:
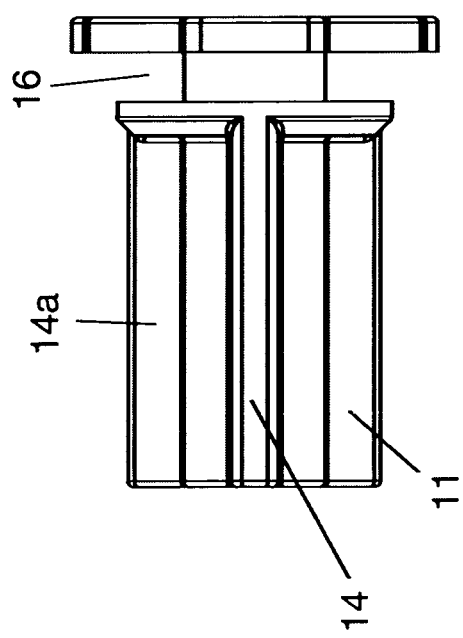
FIGS. 15a-15c show the valve body of FIG. 3b in a plan view, perspective view and side view.
Figure 15A:
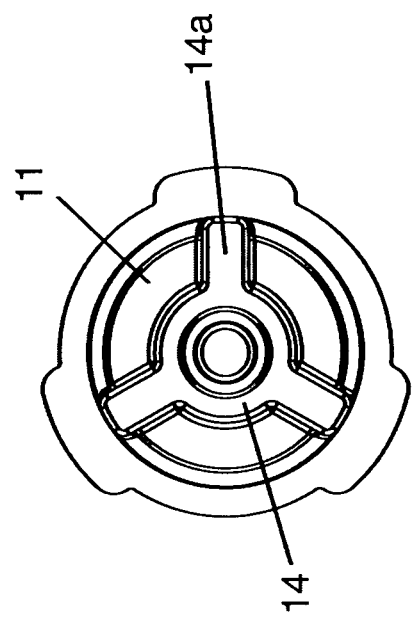
Figure 15B:
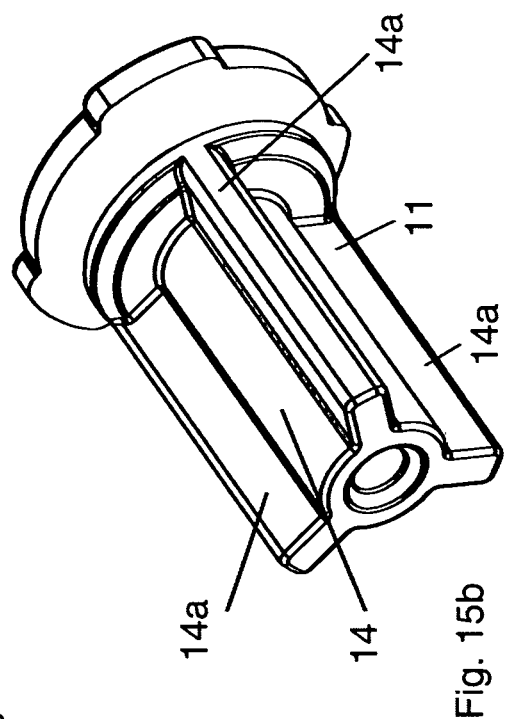

The valve body 11 is illustrated more precisely in FIGS. 15a-c. These figures clearly show the holding portion 14 for the spring which has three ribs 14a which lie against an inner side of the spring. Furthermore, the valve body 11 has a separate sealing element 15 which is illustrated in detail in FIGS. 14a-c. The sealing element 15 is formed in an annular manner. The valve body 11 has a groove-shaped receptacle 16 for the sealing element 15. The assembled state can also be seen clearly in FIG. 4c.

Furthermore, the valve 10 can have clamping means 18, in order to fixate the valve body in the open position. The clamping means 18 comprise protrusions in the manner of a bayonet fitting which are formed on the inner side of the socket 9. This can be clearly seen in FIG. 4b. The valve body 11 can be moved between a position in which the valve body 11 is free and a position in which the valve body 11 is fixed.

The valve body 11 is urged towards the valve seat 13 by means of the spring 12, so that the valve 10 is held automatically closed when it is not actuated.

Furthermore, the valve 10 comprises a holding body 29 which forms an abutment for the spring. The holding body is illustrated in greater detail in FIGS. 12a-c. It can be connected to the valve body 11 my means of a screw (cf. FIG. 4c).

The outer side of the socket 9 is provided with connection means 19 which comprise a thread. Furthermore, a stop 20 for the spring 12 can be formed in the socket.

The main body 8 has connection means 21 which, in the illustrated exemplified embodiment, comprise an external thread.

Furthermore, FIG. 3b shows a port element 22 which forms the connection port 3. The port element 22 has a flange 23, by means of which the port element 22 is connected to the flexible wall of the support element, e.g. by welding. This is not illustrated in the figures. The port element 22 is illustrated more precisely in FIGS. 5a-c. The port element 22 includes an insert 24. The insert 24 which is illustrated in greater detail in FIGS. 6a-d can be fixedly connected to the port element 22 illustrated in FIGS. 5a-5c e.g. by casting. An internal thread 25 is arranged in the insert 24. The socket 9 can be screwed with its external thread 19 into the internal thread 25 (cf. FIG. 4c).

Furthermore, FIG. 3b shows a clamping element 26 which can be screwed to the port element 22. In this manner, in the case of an embodiment of the support element comprising multiple layers, one of the layers can be connected in a clamping manner to the port element 22. The clamping element is illustrated in greater detail in FIGS. 7a to 7d.

Furthermore, FIG. 3b illustrates a first seal 27 which seals the first connection part 6 with respect to the port element 22 and thus with respect to the connection port 3. For this purpose, the connection part 6 has a groove-shaped receptacle 28 (cf. FIG. 4c). The first seal 27 is illustrated more precisely in FIGS. 8a-c.

FIG. 3c shows an exploded view of the elements of the second connection part 7. This connection part comprises a main body 30 on which a socket 31 is arranged. Connection means 32 which comprise a thread are formed on the outer side of the socket 31. The main body 30 has a larger outer diameter than the socket 31. Furthermore, connection means for connecting to the first connection part 6 are provided. In the illustrated exemplified embodiment, these connection means comprise a nut 33 (cf. also FIGS. 10a-e). The nut 33 has an internal thread which can be screwed to the connection means 21 on the main body 8 of the first connection means. The nut 33 then connects the main body 8 to the main body 30. This can also be seen clearly in FIG. 4c.

Furthermore, FIG. 3c illustrates a second seal 34 which seals the second connection part 7 with respect to the second connection port. The second seal 34 is formed identically to the first seal 27 (cf. also views in FIGS. 8a-c).

The second connection part 7 can have a third seal which seals the first connection part 6 with respect to the second connection part 7.

The second connection part 7 which is illustrated in greater detail in FIGS. 9a to 9d has an actuating element 37 which moves the valve body 11 from a closed position to an opened position, if the second connection part 7 is attached to the first connection part 6. The actuating element 37 comprises protruding cams 38 which are formed on the second main body 30. The illustrated embodiment has two cams which can be clearly seen in particular in FIGS. 9a and 9b.

Furthermore, FIG. 3c shows a port element 22 and an insert 24 comprising a clamping element 26. These are formed identically to the corresponding elements described previously in connection with FIG. 3b. Reference is made thereto.

FIG. 3a shows the connection device 5 together with the port elements 22, wherein the first connection part 6 is separate from the second connection part 7. If the first and second connection parts 6, 7 are separate, the first connection part 6 can be screwed with the socket 9 in a particularly simple manner into the connection port 3. The second connection part 7 can be screwed with the socket 31 into the connection port 3' in precisely the same way. Protrusions 40 are formed in each case in the first and second connection parts 6, 7 and can be grasped by a tool, in order to fixedly screw or detach the respective connection part 6, 7. The protrusions 40 are formed as ribs which are arranged in a radial direction.

Then, the first connection part 6 can be connected to the second connection part 7 by screwing the nut 33 to the main body 8. The connected state is illustrated clearly in FIGS. 4a-d. In particular, it can be clearly seen here how the cams 38 move the valve body 11 to the opened position.

What is claimed is:

1. A protective device comprising:
   a membrane and a support device for the membrane, wherein the support device comprises an inflatable first support element with a flexible wall which forms a first pressure chamber, wherein the first support element has a first connection port with a first connection opening, wherein the support device has an inflatable second support element with a flexible wall which forms a second pressure chamber, wherein the second support element has a second connection port with a second connection opening, wherein a connection device for connection the first connection port to the second connection port is provided, wherein the connection device has a first connection part for connecting to the first connection port and a second connection part for connecting to the second connection port, wherein the first connection part comprises a main body having two outer threaded cylindrical portions with the first outer threaded cylindrical portion having a smaller radius than the second outer threaded cylindrical portion, wherein the first and second connection parts are connectable to one another in a detachable manner, wherein the connection device has a valve adapted to shut off the first connection opening, wherein the valve comprises a movable valve body, a valve seat and a biasing member which urges the valve body against the valve seat, wherein the second connection part has an actuating element which is arranged in such a manner that it moves the valve body from a closed position to an opened position if the second connection part is attached to the first connection part.

2. The protective device according to claim 1, wherein the movable valve body comprises a sealing element abutting against the valve seat.

3. The protective device according to claim 1, wherein the first connection part comprises a socket, in which the valve body is at least partially arranged thereby.

4. The protective device according to claim 3, wherein a stop for the spring is arranged in the socket.

5. The protective device according to claim 3, wherein the first connection part has a main body, on which the socket is arranged.

6. The protective device according to claim 1, wherein the second connection part has a socket.

7. The protective device according to claim 6, wherein the second connection part has a main body on which the socket is arranged.

8. The protective device according to claim 1, wherein the actuating element has at least two inwardly facing protrusions that are spaced apart on the second connection element.

9. The protective device according to claim 1, wherein a first seal is provided which seals the first connection part with respect to the first connection port.

10. The protective device according to claim 1, wherein a second seal is provided which seals the second connection part with respect to the second connection port.

11. The protective device according to claim 1, wherein a third seal is provided which seals the main body of the first connection part with respect to the main body of the second connection part.

12. The protective device according to claim 1, wherein at least one of the first support element and the second support element has a port element which forms the first or second connection port.

13. An inflatable support structure for covering by a membrane, the inflatable support structure comprising:
an inflatable first support element with a flexible wall which forms a first pressure chamber, wherein the first support element has a first connection port with a first connection opening and a valve which is adapted to close the first connection opening, wherein the valve comprises a valve body, a valve seat and a biasing member which urges the valve body against the valve seat, wherein the support structure comprises an inflatable second support element with a flexible wall which forms a second pressure chamber, wherein the second support element has a second connection port with a second connection opening, wherein the first and second connection ports are connectable to one another in a detachable manner, wherein the first connection port comprises a main body having two outer threaded cylindrical portions with the first outer threaded cylindrical portion having a smaller radius than the second outer threaded cylindrical portion, wherein when connected the first and second connection ports form a connection device, wherein when the first and second connection ports are connected to one another the valve is opened, and the first and second pressure chambers are inflatable through a single inflation port.

14. The support structure according to claim 13, wherein the valve body comprises a sealing element abutting against the valve seat.

15. The support structure according to claim 13, wherein the first connection port comprises a socket, in which the valve body is at least partially arranged thereby.

16. The support structure according to claim 13, further comprising a membrane adapted to cover the first and second support elements.

17. The support structure according to claim 13, wherein the biasing member is a spring.

* * * * *